United States Patent
Matsunami et al.

(10) Patent No.: US 7,264,733 B2
(45) Date of Patent: Sep. 4, 2007

(54) METHOD FOR TREATING HEAVY-METAL-CONTAINING WASTEWATER USING SULFIDIZING AGENT

(75) Inventors: Toyokazu Matsunami, Osaka (JP); Akifusa Ohnishi, Kanagawa (JP)

(73) Assignee: Aquatech Corporation, Kanagawa (JP)

( * ) Notice: Subject to any disclaimer, the term of this patent is extended or adjusted under 35 U.S.C. 154(b) by 170 days.

(21) Appl. No.: 10/488,390

(22) PCT Filed: Aug. 29, 2002

(86) PCT No.: PCT/JP02/08769

§ 371 (c)(1),
(2), (4) Date: Mar. 2, 2004

(87) PCT Pub. No.: WO03/020647

PCT Pub. Date: Mar. 13, 2003

(65) Prior Publication Data

US 2004/0232084 A1    Nov. 25, 2004

(30) Foreign Application Priority Data

Sep. 3, 2001    (JP)    ............................ 2001-266478

(51) Int. Cl.
*C02F 1/62* (2006.01)
*C02F 101/20* (2006.01)

(52) U.S. Cl. ...................... 210/709; 210/718; 210/724; 210/726; 210/912

(58) Field of Classification Search .................. 210/709

See application file for complete search history.

(56) References Cited

U.S. PATENT DOCUMENTS

| | | | | |
|---|---|---|---|---|
| 4,432,880 A | * | 2/1984 | Talbot | ........................ 210/725 |
| 4,503,017 A | | 3/1985 | Gadd et al. | .................... 423/87 |
| 5,035,807 A | * | 7/1991 | Maree | ........................ 210/711 |
| 5,451,327 A | * | 9/1995 | Straten | ........................ 210/716 |
| 6,153,108 A | * | 11/2000 | Klock et al. | ................ 210/722 |
| 6,896,815 B2 | * | 5/2005 | Cort | ........................... 210/695 |
| 6,896,817 B2 | * | 5/2005 | Bowers | ...................... 210/716 |

FOREIGN PATENT DOCUMENTS

| | | |
|---|---|---|
| JP | 48-096446 A | 12/1973 |
| JP | 49-061956 A | 6/1974 |
| JP | 51-141775 A | 12/1976 |
| JP | 6-079289 A | 3/1994 |
| JP | 11-047764 A | 2/1999 |

* cited by examiner

*Primary Examiner*—Peter A. Hruskoci
(74) *Attorney, Agent, or Firm*—Fildes & Outland, P.C.

(57) ABSTRACT

A method and apparatus for treating heavy-metal-containing wastewater using a sulfidizing agent. Sulfidizing treatment is carried out by adding a sulfidizing agent to heavy-metal-containing wastewater, while detecting hydrogen sulfide gas generated from the wastewater, such as to maintain a state in which hydrogen sulfide gas is just starting to be generated from the wastewater. When separately recovering each of a plurality of metals from wastewater in which are mixed ions of the plurality of metals, there is repeated for each of the metals a process in which the acidity of the wastewater is adjusted to within a range suitable for the metal to be separated out and recovered, a sulfidizing reaction is carried out on that metal, and the metal sulfide produced is precipitated and filtered off.

8 Claims, 10 Drawing Sheets

RELATIONSHIP BETWEEN REACTION pH AND RESIDUAL Pb CONCENTRATION
(CONTROLLED HYDROGEN SULFIDE GAS CONCENTRATION 120 ppm, BATCH TREATMENT)

RELATIONSHIP BETWEEN REACTION pH AND RESIDUAL Pb CONCENTRATION
(CONTINUOUS TREATMENT)

METHOD FOR TREATING HEAVY-METAL-CONTAINING WASTEWATER USING SULFIDIZING AGENT

TECHNICAL FIELD

The present invention relates to a method and apparatus for treating heavy-metal-containing wastewater using a sulfidizing agent.

BACKGROUND ART

If heavy-metal-ion-containing wastewater arising from processes such as plating, metal surface treatment, battery manufacture, printed circuit board manufacture, semiconductor manufacture, incineration residue treatment, metal-contaminated soil improvement and so on is discharged into the environment without being treated, then contamination of the aquatic environment and soil and so on will be brought about, and there will be adverse effects on ecology and human health. In Japan, for example, standards for when discharging into public waters or sewers have thus been laid down.

Among heavy metals, for high-value precious metals such as gold (Au), platinum (Pt), palladium (Pd) and silver (Ag), recycling is economically viable, and hence these precious metals are recovered as much as possible using various methods.

On the other hand, for low-value metals such as iron and aluminum, solid material close to pure metal such as scrap is targeted for recycling, but in the case that the metal is contained in wastewater in the form of ions, recycling is not economically viable, and hence the metal is converted into solid material (sludge) by some method, and disposed of as landfill or the like.

For heavy metals that are somewhat more valuable than iron and aluminum but not as valuable as precious metals, solid metal scrap is recycled, but in the case that the metal is contained in wastewater in the form of ions, the present state of affairs is again that in most cases the metal is separated from the wastewater by some kind of chemical treatment, and is then disposed of as sludge. Examples of these heavy metals are copper (Cu), zinc (Zn), tin (Sn), nickel (Ni), lead (Pb), cadmium (Cd) and so on.

The reason that such heavy metals in wastewater are not targeted for recycling but rather are disposed of as sludge is that sludge obtained using wastewater treatment methods carried out hitherto has had a high water content, and moreover has contained large amounts of substances other than the targeted heavy metal (miscellaneous salts, compounds of other metals etc.), and hence the purity of the targeted metal has been low. To recycle a specific heavy metal from such sludge, it becomes necessary to carry out some kind of pretreatment process before the smelting process, and hence such recycling is not economically viable.

A hydroxide method and a sulfide method are known as methods for treating water distribution containing a heavy metal. Following is a comparison of the two.

(Hydroxide Method)

In the hydroxide method (alkali method) for treating wastewater containing a heavy metal, the (generally acidic) wastewater containing the heavy metal is neutralized by adding an alkaline agent such as caustic soda or slaked lime thereto, whereby the heavy metal ions and hydroxide ions react together to produce a solid having a heavy metal hydroxide as a principal component thereof, and then the solid is removed from the wastewater by being filtered off and then dehydrated.

So long as the wastewater does not contain especially toxic substances, this reaction is not a particularly difficult reaction, operation is simple, and the level of safety is high, and hence most heavy-metal-containing wastewater has been treated using this method hitherto. The reaction formula for this reaction is as in 'reaction formula 1' below.

$$M^{++} + 2OH^- \rightarrow M(OH_2).(H_2O)_n \downarrow \quad \text{reaction formula 1}$$

*: '$.(H_2O)_n$' represents n water of crystallization molecules per molecule of the heavy metal hydroxide, and '$\downarrow$' represents precipitation as a solid.

<Merits of Hydroxide Method>

This reaction is a simple neutralization reaction, and so long as especially toxic substances such as cyanides are not contained in the wastewater, the reaction is not difficult, operation is simple, and the level of safety is high.

The alkaline agent used is not an expensive chemical, and hence the cost of the treatment is not especially high.

However, the hydroxide method, while having merits such as the above, also has drawbacks such as the following.

<Drawbacks of Hydroxide Method>

A fundamental problem is that hydroxides $M(OH_2)$ produced through this reaction do not have sufficiently low solubility, and hence if only this treatment is used then heavy metal ions will remain in the wastewater to some extent after the treatment. There are thus cases in which the method does not conform to wastewater standards in some countries. To make up for this drawback, in general a separate additional measure such as using a chelating agent or mixing in a sulfidizing agent is often required as finishing treatment for further reducing the residual heavy metal concentration.

Regarding a plating process, to make the plating reaction proceed efficiently, a complexing agent that forms a metal complex is often used. However, in the case of heavy-metal-containing wastewater having a complexing agent mixed therein, the complexing agent has an action of impeding the production of the hydroxide, and hence the heavy metal cannot be captured sufficiently using only the hydroxide method. As a result, a large amount of heavy metal ions remains in the wastewater after the treatment, and this exacerbates the drawback described above of the solubility not being low, and hence an additional measure as described above such as using a chelating agent or mixing in a sulfidizing agent becomes yet more necessary.

The sludge generated through the hydroxide method has a high water content, this being partly due to the hydroxide having waters of crystallization as shown in reaction formula 1 above, and moreover the sludge contains large amounts of substances other than the targeted heavy metal such as salts. As a result, not only does the amount of sludge generated increase, but moreover the content of the targeted heavy metal is low, and hence the economic viability of recycling is poor, and thus, despite valuable metal being contained therein, most such sludge is disposed of as landfill or the like in actual practice.

With the hydroxide method, a plurality of heavy metals coexisting in the treated liquid all become hydroxides in a mixed state as is, and hence the individual metals cannot be separately recovered. In the case that a targeted heavy metal has other metals mixed therewith, recycling of the specific metal in the sludge thus becomes difficult.

(Sulfide Method)

In contrast with the hydroxide method described above, there is a sulfide method in which a sulfidizing agent (sodium sulfide ($Na_2S$), sodium hydrogensulfide (NaHS) etc.) is added to heavy-metal-containing wastewater in a reaction tank, and hence a heavy metal sulfide produced through undermentioned reaction formula 2 is precipitated, and then solid-liquid separation is carried out.

The sulfide method has not been used as a major treatment method hitherto due to the drawbacks described below. The method has been used a little in a supplementary fashion as finishing treatment in the case that the residual heavy metal ion concentration has not become sufficiently low through treatment using the hydroxide method.

$$M^{++}+S^{--}\rightarrow MS\downarrow \qquad \text{reaction formula 2}$$

This method, despite having drawbacks as mentioned above and as will be described in detail below, can be said to be intrinsically an excellent method in the following respects.

<Merits of the Sulfide Method>

The solubility of heavy metal sulfides is much lower than that of hydroxides, and hence the residual heavy metal concentration in the wastewater after the treatment (after solid-liquid separation) is extremely low. Additional measures for reducing the residual heavy metal ion concentration are thus unnecessary, and in principle the sulfide method is advantageous as a treatment method for sufficiently reducing the residual heavy metal ion concentration (advanced treatment).

The sulfidizing agent used in this method is sodium sulfide ($Na_2S$), sodium hydrogensulfide (NaHS) or the like, which is inherently produced in secondary fashion in a petroleum desulfurization process; such a sulfidizing agent is more expensive than an alkaline agent, but not particularly expensive.

Due to intrinsic properties of sulfides, sludge containing a heavy metal sulfide obtained using this treatment method has a low water content, and moreover there is little contamination with impurities such as salts, and hence the heavy metal content is higher (i.e. the content of the targeted heavy metal is higher) than in the case of a hydroxide.

Moreover, heavy metal sulfides have the same components as sulfide ores, which are one type of raw material (ore) in heavy metal smelting, and hence combined with the advantages in terms of cost described above, recycling at a smelting plant is easy.

The pH region in which a heavy metal sulfide can exist as a solid without ionizing and dissolving in water varies according to the type of the heavy metal. If this characteristic is skillfully utilized, then even if a plurality of metal species are mixed together in water to be treated, depending on the types of the metals that are mixed together, it may be possible to recover each metal separately.

As the actual operation for such separate recovery, the operation of adjusting the acidity (pH) in the reaction to a range suitable for the targeted metal and then carrying out the sulfidizing reaction, precipitation and filtration is repeated, whereby a sulfide precipitate can be separately recovered for each individual metal from wastewater in which metal ions of a plurality of different types are mixed together.

If each metal can be separately recovered in this way, then this is advantageous for recycling compared with the case of a mixed metal sludge.

Despite the merits in principle of the sulfide method described above, the conventional sulfide method has the following drawbacks, and hence has not been used as a major method of treating heavy-metal-containing wastewater. As described above, the area in which this method has actually been used is as finishing treatment in the case that heavy metal ions cannot be sufficiently captured with the hydroxide method.

<Drawbacks of the Sulfide Method>

There is no suitable control method for supplying the sulfidizing agent in a suitable amount corresponding to the amount of the heavy metal ions. If the amount supplied of the sulfidizing agent is less than the suitable amount for the heavy metal, then the heavy metal ions will not be captured sufficiently as a sulfide, and hence the residual heavy metal ion concentration in the wastewater after the treatment will be high, and thus the objective of the treatment will not be achieved. Conversely, if the supply of the sulfidizing agent is excessive, then fatal problems such as generation of hydrogen sulfide gas and redissolution of the precipitate (heavy metal sulfide) or colloid formation will arise. In theory, it would be preferable to find out the heavy metal ion concentration in advance, and then add the sulfidizing agent in an amount that is a chemical equivalent thereto; however, this method is not practicable as an industrial treatment method for actual wastewater in which the amount or concentration of heavy metal ions will fluctuate. The method conventionally carried out in practice has thus been to add the sulfidizing agent in somewhat of an excess as deemed appropriate, and resolve problems that arise through the excessive addition using another method.

Hydrogen sulfide gas generated upon adding a sulfidizing agent to acidic wastewater excessively is not only malodorous, but moreover is toxic to humans, and hence if there is no method of avoiding the excessive generation of hydrogen sulfide gas, then the sulfide method cannot become a useful and powerful method for treating heavy-metal-containing wastewater.

Hydrogen sulfide gas is generated through reaction between sulfide ions $S^{--}$ and hydrogen ions $H^+$ as shown in undermentioned reaction formula 3, and is readily generated under a strongly acidic state (i.e. when the amount of hydrogen ions is high), becoming less readily generated as the state becomes alkaline, i.e. the amount of hydrogen ions becomes low.

$$2H^{+}+S^{--}\rightarrow H_2S\uparrow \qquad \text{reaction formula 3}$$

*: '↑' represents discharge into the air of a gas generated in a liquid.

If the supply of the sulfidizing agent is excessive, then not only will hydrogen sulfide gas be generated, but moreover the excess sulfide ions and the heavy metal sulfide will react together to produce a polysulfide (reaction formula 4). Polysulfides have a high solubility product, and hence if this reaction occurs, then a problem of the precipitate redissolving will occur, and hence it will no longer be possible to achieve the objective of the treatment of removing the heavy metal from the wastewater. Moreover, the precipitate may form a collide, and hence coagulation ability and filter ability will become poor, and thus solid-liquid separation will become difficult.

$$nMS+mS^{2-}\rightarrow (M_nS_{n+m})^{-2m} \qquad \text{reaction formula 4}$$

As a method that makes up for the drawback of generation of hydrogen sulfide gas and the drawback of redissolution of the precipitate or colloid formation due to generation of a polysulfide described above (i.e. a method for coping with problems such as generation of hydrogen sulfide gas, redissolution of the precipitate, and colloid formation occurring due to excessive addition of the sulfidizing agent), adding a large amount of a compound of a polyvalent metal, i.e. a large amount of Al ions, Fe ions or the like, is carried out. As a result, a large amount of sludge compared with the original amount of the heavy metal is generated, and moreover the content of the targeted heavy metal in the sludge drops, which may result in recycling not being possible.

DISCLOSURE OF THE INVENTION

The present invention (improved sulfide method) aims to fundamentally improve on the drawbacks of the conventional sulfide method, and make best use of the intrinsic merits of the sulfide method, this being from a comparison between the hydroxide method, which is the heavy-metal-containing wastewater treatment method carried out in most publicly known cases, and the conventional sulfide method, which has been carried out as a treatment method supplementary to the hydroxide method.

Specifically, it is an object of the present invention to provide art for controlling the addition of a sulfidizing agent according to which the drawbacks of the sulfide treatment method according to the publicly known art described above can be resolved, whereby excess sulfidizing agent can be prevented from remaining behind in the reaction tank as much as possible, and the metal ion concentration in the wastewater after treatment can be made sufficiently low.

Moreover, it is an object to improve the settling ability, filterability, and dehydration ability of the metal sulfide precipitate produced through such a reaction using suitable amounts, for which solid-liquid separation has been difficult with publicly known art, and thus obtain sludge having a low water content and a high heavy metal content, and hence not only keep down the amount of sludge generated, but also make recycling of the heavy metal easy, this being by using a suitable coagulant of an anionic type, a cationic type, a nonionic type, a chitin type or the like as a coagulant on the metal sulfide precipitate.

Furthermore, in the case of using a compound of a polyvalent metal, i.e. Al ions, Fe ions or the like, to prevent the generation of hydrogen sulfide gas in the publicly known sulfide method, a large amount of sludge compared with the amount of the metal targeted for treatment is generated, and hence it is also an object of the present invention to provide a method in which, in contrast to this, such a compound of a polyvalent metal is not added, whereby the amount of sludge generated is kept down, and the purity of the targeted metal in the sludge is increased, and hence sludge for which recycling is easy is obtained.

Moreover, it is an object to separately recover each individual heavy metal as a sulfide from wastewater in which two or more heavy metals coexist in the case that this is possible in accordance with conditions such as the types of the metals coexisting and the degree to which separation is necessary.

Furthermore, it is an object of the present invention as an environmental measure to make things such that hydrogen sulfide gas that is generated in the reaction and is collected for gas monitoring and hydrogen sulfide gas that is surplus thereto is not discharged directly into the atmosphere, and hence hydrogen sulfide gas is hardly discharged into the external environment.

To attain these objects, in a method of treating heavy-metal-containing wastewater using a sulfidizing agent according to the present invention, sulfidizing treatment is carried out by adding a sulfidizing agent to the heavy-metal-containing wastewater, while detecting hydrogen sulfide gas generated from the wastewater, such as to maintain a state in which hydrogen sulfide gas is just starting to be generated from the wastewater.

Moreover, in a method of treating heavy-metal-containing wastewater using a sulfidizing agent according to the present invention, the sulfidizing treatment is carried out by adding the sulfidizing agent to the heavy-metal-containing wastewater such that the detected concentration of hydrogen sulfide gas exceeds 0 ppm but is not more than a hydrogen sulfide gas concentration corresponding to a liquid reaction endpoint for the heavy metal.

Moreover, in a method of treating heavy-metal-containing wastewater using a sulfidizing agent according to the present invention, the sulfidizing treatment is carried out by adding the sulfidizing agent to the heavy-metal-containing wastewater such that the detected concentration of hydrogen sulfide gas exceeds 0 ppm but is not more than 240 ppm.

Moreover, in a method of treating heavy-metal-containing wastewater using a sulfidizing agent according to the present invention, hydrogen sulfide gas generated from the wastewater is diluted with air, and then the hydrogen sulfide gas concentration is detected using a hydrogen sulfide gas monitor.

Moreover, in a method of treating heavy-metal-containing wastewater using a sulfidizing agent according to the present invention, a coagulant is used on the heavy metal sulfide produced through the sulfidizing treatment.

Moreover, in a method of treating heavy-metal-containing wastewater using a sulfidizing agent according to the present invention, after the sulfidizing treatment, the wastewater is subjected to stripping under acidic conditions, thus converting unreacted sulfidizing agent into hydrogen sulfide gas.

Moreover, in a method of treating heavy-metal-containing wastewater using a sulfidizing agent according to the present invention, the generated hydrogen sulfide gas is captured and collected.

In a method of separately recovering each of a plurality of metals from wastewater in which are mixed ions of the plurality of metals according to the present invention, for each of the metals, there is repeated a process of adjusting the acidity of the wastewater to within a range suitable for the metal to be separated out and recovered, carrying out a sulfidizing reaction on that metal using any of the treatment methods described above, and precipitating and filtering off the metal sulfide produced.

An apparatus for treating heavy-metal-containing wastewater using a sulfidizing agent according to the present invention has a hydrogen sulfide gas monitor that detects hydrogen sulfide gas generated from the wastewater, and means for adding a sulfidizing agent to the heavy-metal-containing wastewater, wherein the hydrogen sulfide gas monitor is constituted so as to be able to detect a state in which hydrogen sulfide gas is just starting to be generated from the wastewater, and the means for adding the sulfidizing agent is constituted so as to be able to add the sulfidizing agent to the heavy-metal-containing wastewater such as to maintain a state in which hydrogen sulfide gas is just starting to be generated from the wastewater, based on an output from the hydrogen sulfide gas monitor.

It is considered that the improved sulfide method according to the present invention has technical value principally in the following four respects.

(1) Value as a Precise Reaction Control Method for Suppressing the Generation of Hydrogen Sulfide Gas While making the reaction between the heavy metal and the sulfidizing agent proceed neither too little nor too much, the amount of hydrogen sulfide gas generated in the reaction can be kept down to a minimum, and moreover gas surplus to the gas monitoring can be collected and recycled.

(2) Value as an Advanced Treatment Method for Heavy-metal-containing Wastewater

The residual heavy metal concentration in the wastewater after the treatment can be made lower than with a publicly known hydroxide method or sulfide method.

(3) Value as Method for Keeping Down Amount of Sludge Generated

Compared with a conventional method, the water content of the sludge is lower, and the amount of impurities is lower, and hence the amount of sludge generated, i.e. the amount of sludge to be dealt with, is reduced.

(4) Value as a Method of Recovering Valuable Heavy Metals

Metal sulfides of relatively high purity can be obtained, and hence recycling of valuable heavy metals becomes easy.

DETAILED DESCRIPTION OF THE DRAWINGS

BEST MODE FOR CARRYING OUT THE INVENTION (Basic Principles of the Present Invention)

The general principles of the reaction and the control of the supply of the sulfidizing agent in the improved sulfide method of the present invention are as follows (see FIG. 1).

As shown in reaction formula 2, mentioned earlier and given again below, heavy metal ions $M^{++}$ in the treated liquid react with sulfide ions $S^{--}$ supplied as a sulfidizing agent to produce a solid heavy metal sulfide MS.

$$M^{++}+S^{--} \rightarrow MS\downarrow \qquad \text{reaction formula 2}$$

Figure 1:
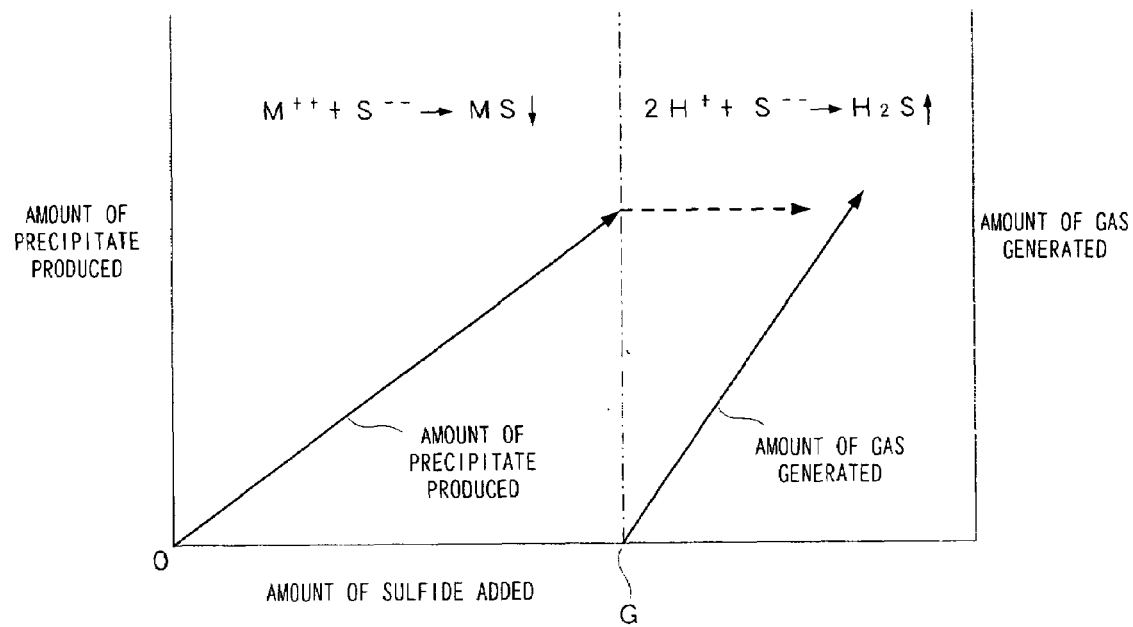
FIG. 1 is a graph showing the relationship between the amount of sulfide added, and the amount of precipitate produced and the amount of hydrogen sulfide gas generated.

In FIG. 1, it is shown that the amount produced of the precipitate increases as the amount added of the sulfide is increased. If the sulfidizing agent continues to be supplied even when this reaction has proceeded and hence the heavy metal ions in the treated liquid have been consumed (i.e. even when the reaction of reaction formula 2 between the heavy metal ions and the sulfide ions has finished), then an excess of sulfide ions will arise, and hence under acidic conditions, the reaction of reaction formula 3, mentioned earlier and given again below, between sulfide ions $S^{--}$ and hydrogen ions $H^+$ will commence.

$$2H^++S^{--} \rightarrow H_2S\uparrow \qquad \text{reaction formula 3}$$

However, while heavy metal ions are present in the liquid, the reaction of reaction formula 2 is favored, and generation of gas through the reaction of formula 3 does not occur.

As a result of the reaction of formula 3, hydrogen sulfide gas $H_2S$ will be generated in the reaction liquid, and will then be discharged into the air above the reaction liquid. In FIG. 1, the time at which hydrogen sulfide gas starts to be generated is shown as point G. According to the present invention, when hydrogen sulfide gas starts to be discharged into the air in this way, a trace of this hydrogen sulfide gas is detected by a hydrogen sulfide gas monitor. The addition of the sulfidizing agent is then controlled such that the reaction of formula 2 proceeds as much as possible and hence the residual heavy metal ion concentration becomes low, and yet the reaction of formula 3 occurs as little as possible.

If the supply of the sulfidizing agent is insufficient, then the reaction of formula 2 will not proceed sufficiently, i.e. the state will be well to the left of point G in FIG. 1, and it will not be possible to achieve substantial removal of heavy metal ions, which is the objective of the treatment. Conversely, if the supply of the sulfidizing agent is excessive, then the reaction of formula 3 will occur, i.e. the state will be well to the right of point G in FIG. 1. Consequently, not only will harmful, malodorous hydrogen sulfide gas be generated, but moreover a polysulfide (polysulfide ions) will be produced through the reaction between the excess sulfide ions and the heavy metal sulfide of formula 4, mentioned earlier and given again below. A problem will thus arise in that the precipitate will form a colloid and hence the coagulation ability will become poor, and moreover the precipitate will redissolve due to the polysulfide having a high solubility product, and hence it will no longer be possible to achieve the objective of the treatment.

$$nMS+mS^{2-} \rightarrow (M_nS_{n+m})^{-2m} \qquad \text{reaction formula 4}$$

With a publicly known sulfide method, there is no suitable control method for the supply of the sulfidizing agent, and hence, as described earlier, the sulfidizing agent is added in excess to some extent. To resolve the problems described earlier that occur as a result, a large amount of a compound of a polyvalent metal, i.e. a large amount of Al ions, Fe ions or the like, is thus added. As a result, a large amount of sludge containing the added polyvalent metal compound or the like is generated. The content of the targeted heavy metal in the sludge thus becomes low, and hence recycling becomes very difficult.

With the present invention, expressing matters simply, the generation of a trace of hydrogen sulfide gas is taken as a state in which there is a very slight excess of the sulfidizing agent, and if hydrogen sulfide gas is generated then this is taken as the endpoint of the reaction between the heavy metal ions and the sulfide ions, and further supply of the sulfidizing agent is ceased, whereby excess reaction is suppressed. As a result, the heavy metal ions can be removed sufficiently, and generation of hydrogen sulfide gas that is excessive to the extent of becoming a problem can be suppressed, and moreover redissolution of the precipitate or hampering of the solid-liquid separation due to colloid formation caused by production of a polysulfide can be prevented.

(Details of Reaction Control in the Present Invention)

Figure 2:
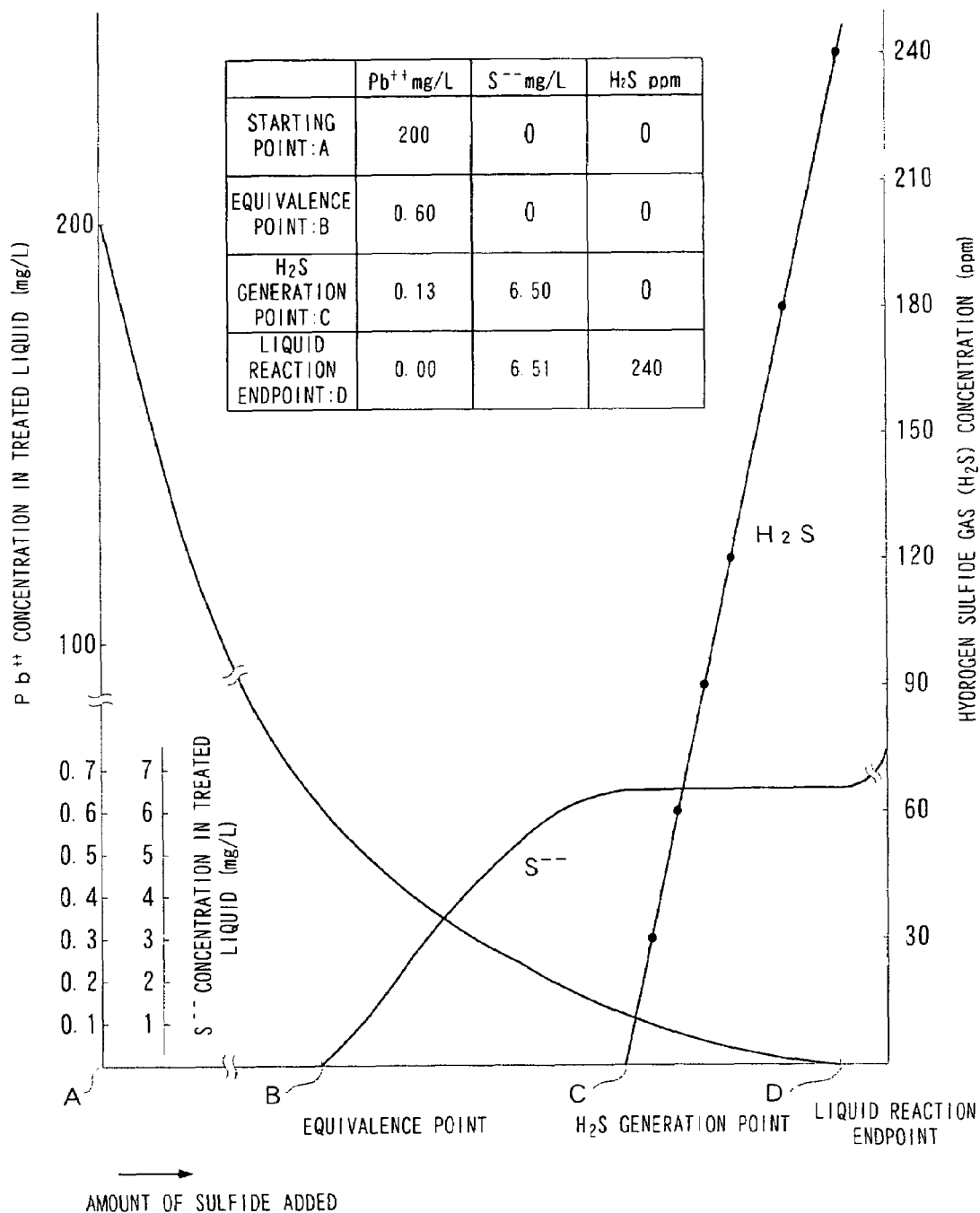
FIG. 2 is a graph showing the progress of reaction upon adding a sulfide to a treated liquid containing $Pb^{++}$.

Following is a more detailed explanation of the workings of the reaction control in the present invention (see FIG. 2).

First, a detailed description will be given of FIG. 2. FIG. 2 shows results of an experiment carried out by the present inventors, and shows the progress of reaction upon adding a sulfide to a treated liquid containing $Pb^{++}$. The horizontal axis shows the amount of the sulfide added as in FIG. 1. The vertical axis shows the $Pb^{++}$ concentration in the treated liquid, which drops as the sulfide is added, the $S^{--}$ concentration in the treated liquid, which rises as the sulfide is added, and the concentration of hydrogen sulfide gas ($H_2S$), which is generated through the addition of the sulfide.

As shown in FIG. 2, the $Pb^{++}$ concentration, which was 200 mg/L at the starting point A, drops as the sulfide is added. At the equivalence point B for the reaction, 0.60 mg/L of $Pb^{++}$ actually remains, and beyond point B, $S^{--}$ appears in the treated liquid. If the sulfide is further added, then at point C hydrogen sulfide gas ($H_2S$) starts to be generated. At point C, the $Pb^{++}$ concentration is 0.13 mg/L, and the $S^{--}$ concentration is 6.50 ppm. Point D is the liquid reaction endpoint, where the $Pb^{++}$ concentration becomes 0.00 mg/L. At this time, the $S^{--}$ concentration is 6.51 ppm, and the hydrogen sulfide gas ($H_2S$) concentration is 240 ppm.

As can be seen from FIG. 2, to make the reaction between the sulfide (sulfide ions $S^{--}$) and the heavy metal ions ($M^{++}$) progress until the objective of the treatment has been achieved (i.e. the residual heavy metal ion concentration has become sufficiently low), in actual practice the concentration of the sulfidizing agent remaining in the vessel must be maintained at a slight excess, but must be controlled within a range so as not to exceed a certain limit (i.e. a range approximately between point C and point D in FIG. 2).

According to the findings of the present inventors, as shown in FIG. 2, there are cases in which, if the sulfidizing agent concentration is not at a slight excess, then heavy metal ions remain to some extent, and hence the objective of the treatment cannot be sufficiently achieved.

Conversely, if the sulfidizing agent concentration exceeds an appropriate limit and becomes excessive, then hydrogen sulfide gas, which is toxic and malodorous, will be generated in a large amount, and hence there will be adverse effects on the surrounding environment, and moreover polysulfide production will cause problems with solid-liquid separation.

The aerial concentration of hydrogen sulfide gas discharged in the upper portion of the reaction tank from the treated liquid that corresponds to an appropriate concentration range for the sulfide ions so as to react sufficiently with the heavy metal ions should be determined experimentally in accordance with the reaction conditions such as the type of the heavy metal and the desired residual heavy metal concentration after the treatment. Here, the hydrogen sulfide gas ($H_2S$) concentration in the air above the treated liquid corresponding to an appropriate concentration of the sulfide ions $S^{--}$ in the reaction liquid will be referred to as the 'controlled hydrogen sulfide gas concentration'.

To carry out such control, a hydrogen sulfide gas monitor that monitors the aerial concentration of the discharged hydrogen sulfide gas is provided, and the amount of the sulfide added is regulated based on the monitoring results. A hydrogen sulfide gas monitor thus has acute sensitivity, i.e. one designed such as to be able to detect hydrogen sulfide gas in a concentration range, for example, no more than 50 ppm is thus used (concentrations above 50 ppm can also be detected, but because this is outside the measurement range, it is difficult to apprehend the concentration accurately). In actual practice, to maintain the monitoring performance, and for the case that the monitored gas should happen to leak out, it is preferable to carry out the monitoring in a region close to the lower limit of the range if possible (e.g. around 10 ppm or below, which is the limit for ambient air quality standards in Japan).

Note that, as shown in FIG. 2, between point C and point D where the residual heavy metal ion concentration has become sufficiently low, the hydrogen sulfide gas concentration changes, and moreover the concentration of sulfide ions $S^{--}$ in the treated liquid changes. However, the rate of change for the sulfide ions $S^{--}$ is only slight; in the case of FIG. 2, the sulfide ion $S^{--}$ concentration is 6.50 mg/L at point C and 6.51 mg/L at point D, i.e. there is hardly any difference between the two. Effective monitoring will thus not be possible if it is the sulfide ion $S^{--}$ concentration that is monitored.

The above-mentioned controlled hydrogen sulfide gas concentration is determined experimentally, and will vary according to conditions such as the heavy metal targeted, the concentration of ions of this heavy metal before the treatment, and the desired residual concentration after the treatment. According to the findings of the present inventors, from experimental results for Cu, Zn, Fe, Ni and soon, it is appropriate to set the controlled hydrogen sulfide gas concentration to a value of no more than 240 ppm (see FIG. 2).

The gas monitoring is carried out with the gas above the treated liquid inside the reaction tank made to be at reduced pressure by being sucked using a blower. In this case, the hydrogen sulfide gas is diluted by external air that comes in from outside the reaction tank in accordance with the amount of gas sucked. In actual practice, the dilution factor is set by adjusting a flow meter, taking into consideration the controlled hydrogen sulfide gas concentration and the sensitivity of the hydrogen sulfide gas monitor.

From the experimental results of the present inventors, it has been ascertained that in actual practice a dilution factor in a range of 10 to 50 times is suitable. Specifically, there is a certain relationship between the concentration of sulfide ions $S^{--}$ in the reaction liquid and the concentration of hydrogen sulfide gas $H_2S$ in the air above the reaction liquid. Here, the hydrogen sulfide gas ($H_2S$) concentration in the air above the reaction liquid corresponding to an appropriate concentration of sulfide ions $S^{--}$ in the reaction liquid is referred to as the 'controlled hydrogen sulfide gas concentration' as described above. According to the experiments of the present inventors, a range of not more than 240 ppm is appropriate for this controlled hydrogen sulfide gas concentration. Since the hydrogen sulfide gas is diluted by approximately 10 to 50 times with external air, it is necessary to carry out adjustment such that a hydrogen sulfide gas ($H_2S$) concentration in the monitored air of less than 10 ppm can be detected.

As shown in FIG. 2, in the range between point C and point D where the heavy metal ion concentration has dropped sufficiently, the unreacted sulfidizing agent exists in the liquid in the form of sulfide ions $S^{--}$. Stripping is thus carried out in which air is blown into the liquid under acidic conditions, thus converting the unreacted sulfidizing agent into hydrogen sulfide gas ($H_2S$). Upon generating hydrogen sulfide gas ($H_2S$) through the stripping, the hydrogen ion concentration in the liquid drops, and hence the pH rises. With this treatment, if the treated liquid is aerated with a volume of air approximately 100 times the volume of the treated liquid, then most of the sulfide ions are removed from the liquid.

The hydrogen sulfide gas produced is fed to a scrubber along with the hydrogen sulfide generated from the treated liquid upon adding the sulfidizing agent as described above and the hydrogen sulfide used in the monitoring, and is, for example, captured using an alkaline liquid such as a caustic soda aqueous solution, and thus recovered in the form of a sodium sulfide solution, and then reused.

(Range of Application of the Control Method of the Present Invention)

Note, however, that even if there is an excess of sulfide ions in the reaction liquid, the reaction of formula 3 that generates hydrogen sulfide gas will not readily occur if sufficient hydrogen ions are not present (i.e. this reaction will occur under acidic conditions but will not readily occur under alkaline conditions). In actual practice, hydrogen sulfide gas is not readily generated if the pH exceeds 7, and is virtually no longer generated at all if the pH exceeds 8. In the alkaline region, because hydrogen sulfide gas will not be readily generated, even if the control method of the present invention were used, excessive addition of the sulfidizing agent could not be controlled; although there would be virtually no hydrogen sulfide gas generated, it would thus not be possible to prevent polysulfide production and colloid formation.

Consequently, the reaction control method of the present invention based on the above principles can basically be said to be effective in a range from the acidic region to the neutral region. The method is effective, in particular, in the treatment of wastewater containing heavy metals such as Cu, Cd, Pb, Sn and Zn.

Figure 3:
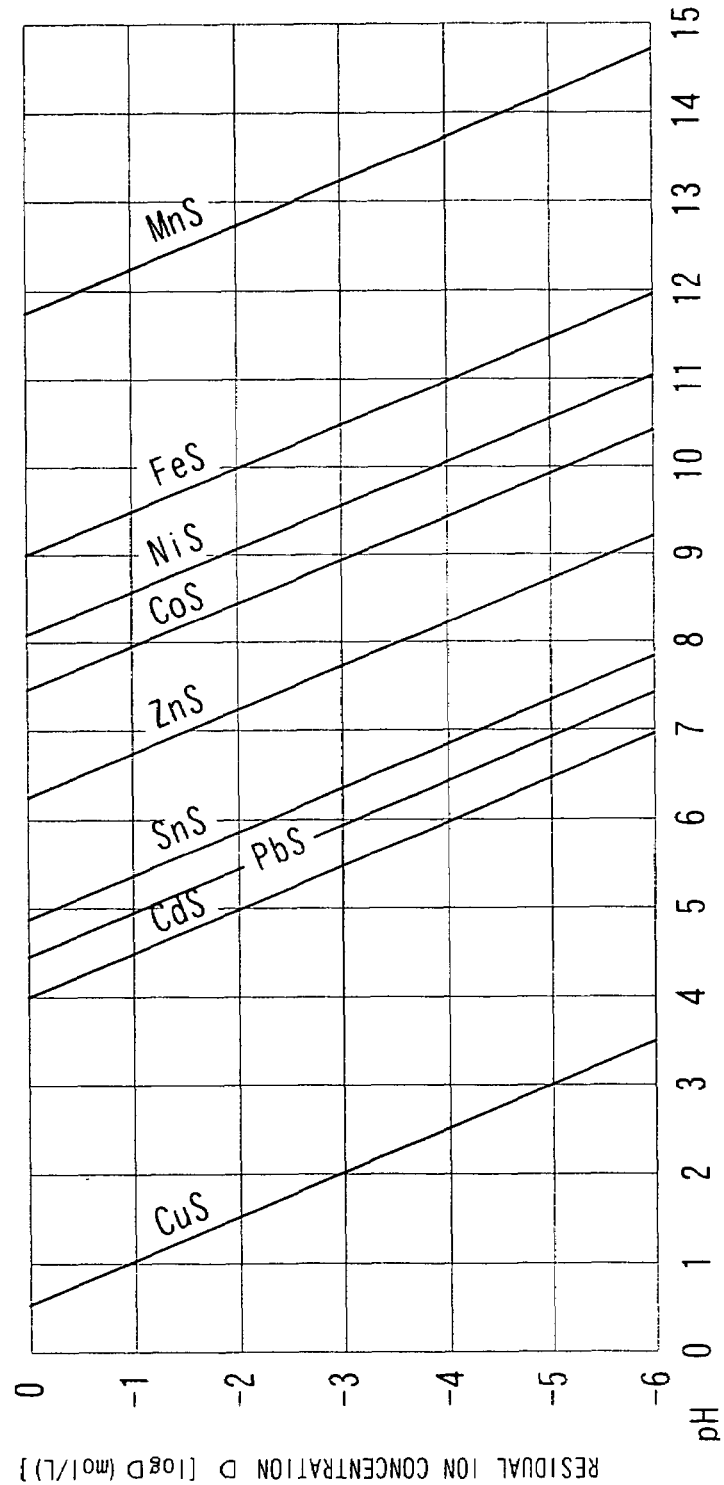
FIG. 3 is a graph showing the pH regions in which various metal sulfides can exist stably.

FIG. 3 shows the pH regions in which various metal sulfides can exist stably. Looking at FIG. 3, the method of the present invention cannot be applied to heavy metals for which the pH (acidity) region in which the metal sulfide can exist stably as a solid without dissociating into heavy metal ions and sulfide ions (i.e. without dissolving in water as an electrolyte) is on the alkaline side, for example manganese; nickel is in a borderline position in this regard.

In actual practice, with nickel-containing wastewater, making the residual nickel ion concentration in the wastewater sufficiently low (e.g. not more than a few ppm) is difficult with the method of the present invention. In particular, in the case, for example, that the wastewater is contaminated with ammonia and this will become a gas on the alkaline side, to suppress the generation of a bad odor, the reaction must be carried out with the pH adjusted to be lowish (7.5 or less). In this case, the nickel ion concentration after the treatment will not be sufficiently low.

Nevertheless, even if the residual heavy metal ion concentration does not become sufficiently low through the reaction under a lowish pH and hence the objective as a wastewater treatment method is not sufficiently achieved, in actual practice almost 99% of the nickel can be recovered from wastewater having a high nickel ion concentration of several thousand ppm such as electroless nickel plating wastewater, and hence it is considered that the method of the present invention is still an excellent method if regarded not as a method for advanced treatment but rather as a method for recovering the heavy metal.

(Separate Recovery of Heavy Metals Coexisting in Wastewater)

Depending on the types of the heavy metals, a plurality of heavy metals can be separately recovered as individual metal sulfides from wastewater containing a mixture of ions of the plurality of heavy metals (see FIG. 3).

The principle behind this is that the pH (acidity) region in which a metal sulfide can exist stably as a solid without dissociating into heavy metal ions and sulfide ions (i.e. without dissolving in water as an electrolyte) differs according to the type of the heavy metal.

This principle is a publicly known fact, and yet the separation of two or more heavy metals only becomes possible in practice upon controlling the pH to some degree of precision, and controlling the addition of the sulfidizing agent precisely as in the present invention.

With the example of FIG. 3, the metal for which a sulfide precipitate is formed furthest to the acidic side is copper (Cu), followed by cadmium (Cd), lead (Pb), tin (Sn), zinc (Zn), cobalt (Co), nickel (Ni) and so on in this order. Separation is easy for heavy metal elements that are sufficiently far apart in a horizontal direction in FIG. 3, and is difficult for heavy metal elements that are close together.

In actual practice, first the heavy metal furthest to the acidic side is focused upon, and the wastewater is adjusted to a suitable pH, the sulfidizing agent is added, and a precipitate of the sulfide of the targeted heavy metal is produced with good precision using the method of the present invention described above. The precipitate produced is then separated off by filtration, and then a similar operation is repeated for the next heavy metal remaining in the filtrate; two or more heavy metals mixed together can thus each be separated out as the sulfide thereof.

This operation can be carried out repeatedly using one reaction tank by successively returning the filtrate from the previous stage into the reaction tank, or can be carried out by connecting together similar reaction tanks in series and repeating the same process serially.

The following were ascertained from experiments carried out on actual plating wastewater by the present inventors.

(1) From wastewater containing copper ions and other heavy metal ions, by first adjusting the pH to from 1.5 to 2.0, and then producing a sulfide, copper sulfide having hardly any other metals mixed therein can be obtained.

(2) In the case of wastewater containing a mixture of zinc ions and nickel ions, by carrying out a first stage operation (production of sulfide, filtration/separation) at a pH of 5.5, and then carrying out a second stage operation at a pH of 7.0 on the filtrate, zinc sulfide slightly contaminated with nickel sulfide, and nickel sulfide hardly contaminated with zinc sulfide at all can be obtained (details will be given later).

(3) For the removal of lead ions, reacting at a pH close to 4.0 is judged to be optimum (details will be given later).

(4) From the above, from a mixed liquid containing metal ions of the three types of copper, lead and nickel, by repeating a similar operation with the pH adjusted to 2, 4 and then 8 in this order, the copper, lead and nickel can be removed as the respective sulfides.

(Difference in the Control Method Between Continuous Type Treatment and Batch Type Treatment)

The treatment of heavy-metal-containing wastewater according to the present invention can be carried out as either continuous type treatment or batch type treatment.

In continuous type treatment, the heavy metal and the sulfidizing agent are reacted together in a reaction tank, and during this overflowing treated liquid is automatically fed into a coagulation tank, a coagulant is added here, and then the treated liquid is fed into a sedimentation tank. If the overflow liquid is fed into the coagulation tank with unreacted heavy metal ions still remaining therein, then heavy metal ions will also remain in the final filtrate, and hence the objective of the treatment will not be sufficiently achieved. A state in which the reaction between the heavy metal ions and the sulfide ions is always sufficiently progressed in the reaction tank must thus be maintained. It is thus necessary for the sulfide ions to always be slightly in excess in the reaction tank, and hence corresponding to this, the addition of the sulfidizing agent must be controlled such that a trace of hydrogen sulfide gas is always being generated.

In actual practice, the following operation is carried out such that a trace of hydrogen sulfide gas is always being generated, and thus the reaction is made to progress sufficiently, and yet the amount of the sulfidizing agent does not become excessive.

(a) The sulfidizing agent is added to the raw liquid to be treated in the reaction tank initially until hydrogen sulfide gas is detected.

(b) Once hydrogen sulfide gas starts to be detected, control is continuously carried out in which, while intermittently supplying additional raw liquid to be treated into the reaction tank, the supply of the sulfidizing agent is stopped or the amount supplied is restricted, so that hydrogen sulfide gas is always being discharged, and yet the range of the controlled hydrogen sulfide gas concentration is kept within.

Figure 4:
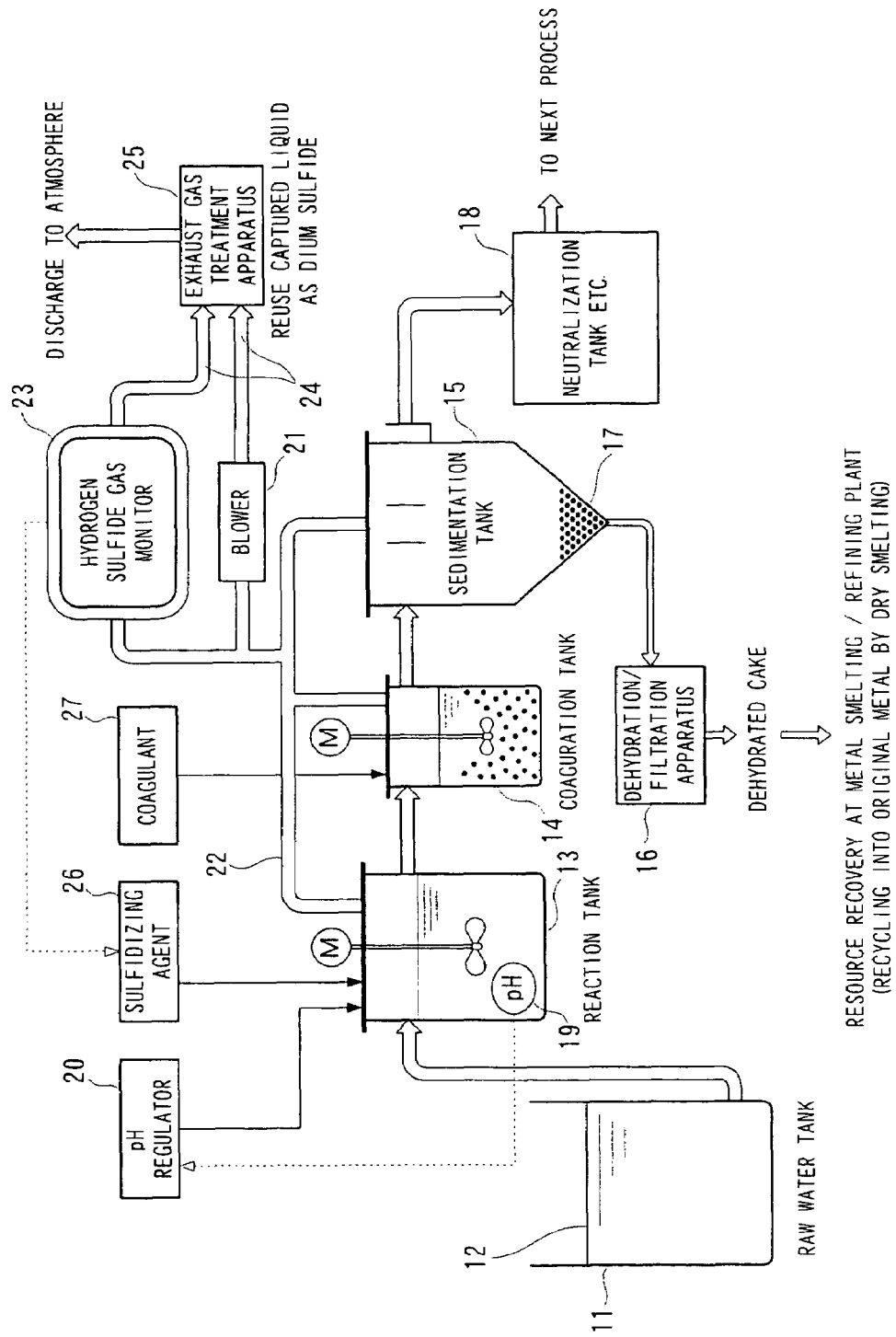
FIG. 4 is a block diagram showing an example of the constitution of a continuous treatment type apparatus for treating heavy-metal-containing wastewater in accordance with the present invention.

FIG. 4 is a block diagram showing an example of the constitution of a continuous treatment type apparatus for treating heavy-metal-containing wastewater in accordance with the present invention. Reference numeral 11 donates a raw water tank, in which is stored raw water, i.e. a liquid 12 to be treated. A reaction tank 13 is connected to the raw water tank 11, a coagulation tank 14 is connected to the reaction tank 13, and a sedimentation tank 15 is connected to the coagulation tank 14. Reference numeral 16 donates a dehydration/filtration apparatus for dehydrating and filtering off sediment 17 that has settled in the sedimentation tank 15. A neutralization tank 18 or the like is connected to the sedimentation tank 15. A pH sensor 19 is provided in the reaction tank 13, and the constitution is made to be such that a pH regulator 20 can be supplied into the reaction tank 13 in accordance with the detection results from the pH sensor 19.

A monitored gas path 22 for sucking out the gas present above the treated liquid using a blower 21 is connected to the reaction tank 13, the coagulation tank 14 and the sedimentation tank 15, and this monitored gas path 22 is connected to a hydrogen sulfide gas monitor 23. Exhaust paths 24 from the blower 21 and the hydrogen sulfide gas monitor 23 lead out into the atmosphere via an exhaust gas treatment apparatus 25.

In accordance with the present invention, a constitution is adopted such that a sulfidizing agent 26 can be supplied into the reaction tank 13 in accordance with instructions from the hydrogen sulfide gas monitor 23. A constitution is adopted such that a coagulant 27 can be supplied into the coagulation tank 14.

According to such constitution, in the reaction tank 13, the pH of the treated liquid is adjusted in accordance with FIG. 3 by supplying the pH regulator 20, and a metal sulfide is precipitated by supplying the sulfidizing agent 26. At this time, in accordance with the present invention, the hydrogen sulfide gas concentration is detected by the hydrogen sulfide gas monitor 23, whereby the generation of hydrogen sulfide gas is suppressed as much as possible. The treated liquid containing the precipitated metal sulfide is subjected to the supply of the coagulant 27 in the coagulation tank 14, whereby the metal sulfide contained in the treated liquid coagulates, and then the coagulated matter is supplied into the sedimentation tank 15 along with the treated liquid 12 and settles. The sediment 17 is taken out of the tank, and is dehydrated and filtered using the dehydration/filtration apparatus 16, thus producing dehydrated cake.

According to the present invention, the dehydrated cake containing the heavy metal sulfide can be subjected to resource recovery at a metal smelting and refining plant as shown in FIG. 4, and can be recycled efficiently into the original metal by dry smelting or the like.

The exhaust gas discharged from the blower 21 and the hydrogen sulfide gas monitor 23 contains hydrogen sulfide gas, but this hydrogen sulfide gas is captured as a captured liquid containing hydroxide by the exhaust gas treatment apparatus 25, and then this captured liquid is reused as sodium sulfide.

In comparison to the continuous type operation described above, in the case of batch type operation, the control operation becomes simple in theory.

Specifically, the sulfidizing agent is added to the raw liquid to be treated in a reaction tank, and once hydrogen sulfide gas is generated, the supply of the sulfidizing agent is ceased, thus ending the reaction. After that, a coagulant is added to the reaction tank, it is waited for the precipitate to settle, and then the filtration/dehydration operation is passed onto.

However, it is thought that the reaction between the heavy metal ions and the sulfidizing agent of undermentioned reaction formula 5 in which $Na_2S$ is used as the sulfidizing agent does not occur instantaneously, but rather a certain time is required.

$$M^{++}+Na_2S \rightarrow MS\downarrow+2Na^+ \quad \text{reaction formula 5}$$

Consequently, with the reaction between the heavy metal ions and the sulfide ions in the case of batch type operation, to make the reaction proceed rapidly, and thus shorten the reaction time (the time up to the reaction endpoint) as much as possible, it is again preferable for the sulfide ion concentration in the reaction tank during the reaction to be at a slight excess.

Due to the above, with actual treatment according to the present invention, regardless of whether it is continuous type treatment or batch type treatment, there operates a control function such that a trace of hydrogen sulfide gas is always generated during the reaction, but the concentration thereof in the air is not more than the controlled hydrogen sulfide gas concentration.

(Advantages of the 'Improved Sulfide Method' of the Present Invention)

The improved sulfide method of the present invention is, in the case of a method of treating heavy-metal-containing wastewater by adding a sulfidizing agent to the wastewater in a reaction tank (the sulfide method), a treatment method that has the following seven points relating to everything from the principle of the technique to devising the apparatus as advantages.

(1) Precise Reaction Control through Hydrogen Sulfide Gas Monitoring

In the publicly known sulfide method, there has been no appropriate method of controlling the amount supplied of the sulfidizing agent, and hence there have been problems due to excessive supply of the sulfidizing agent such as generation of hydrogen sulfide gas, which is toxic and malodorous, and redissolution of the precipitate (heavy metal sulfide) or formation of a colloid.

In contrast with this, in the method of the present invention, by detecting a trace of hydrogen sulfide gas generated in the reaction using a hydrogen sulfide gas monitor, the reaction can be controlled precisely such that the supply of the sulfidizing agent does not become excessive.

In actual practice, the supply of the sulfidizing agent is regulated (a sulfidizing agent supply pump is controlled) such as to keep the discharged gas concentration within an appropriate range, whereby the sulfide ion concentration in the reaction liquid, which corresponds to the discharged gas concentration with a certain relationship, is kept appropriate. As a result, while making the reaction proceed sufficiently, problems that would make the treatment difficult such as generation of a large amount of hydrogen sulfide gas, redissolution of the precipitate, and colloid formation can be avoided.

(2) Good Precipitation Due to Using a Coagulant

With the publicly known sulfide method, for the produced heavy metal sulfide, due to the sulfidizing agent being added excessively, a metal polysulfide is produced, and the solid particles form a collide. The settling ability, filterability, and dehydration ability of the precipitate thus become poor, and hence solid-liquid separation becomes difficult, and thus it is difficult to achieve the objective of the treatment.

In contrast, in the present invention, by using a suitable coagulant of an anionic type, a cationic type, a nonionic type, a chitin type or the like as a coagulant on the heavy metal sulfide that is obtained as a result of the reaction of (1) between suitable amounts of the sulfidizing agent and the heavy metal ions, a precipitate having remarkably good settling ability, filterability, and dehydration ability is obtained. Solid-liquid separation is thus easy, and hence the objective of the treatment is easily achieved.

(3) Sludge with Low Water Content and High Heavy Metal Content

The publicly known hydroxide method (alkali method) is the method of treating wastewater containing heavy metal ions that is easiest and safest, and most heavy-metal-containing wastewater is treated using this method. However, the sludge generated has a high water content, and moreover the sludge contains large amounts of substances other than the targeted heavy metal. The amount of sludge to be dealt with thus increases, and moreover the content of the targeted heavy metal is low, and hence the economic viability of recycling is poor, and thus, despite valuable metal being contained therein, most such sludge is disposed of as landfill or the like in actual practice.

In contrast, in the present invention, due to advantages (1) and (2) described above, sludge having a sufficiently low water content and a sufficiently high content of the targeted heavy metal is obtained. Consequently, not only is the amount of sludge to be dealt with greatly reduced, but moreover there is an advantage in terms of the economic viability of subjecting the sludge to recycling as a heavy metal resource, and thus selling the sludge as a valuable commodity may be profitable.

(4) Separate Recovery of Mixed Metals

In the hydroxide method, it is not possible in practice to separately recover each of the metals from wastewater in which ions of a plurality of different metals coexist.

In contrast, with the sulfide method of the present invention, depending on the types of the metals that coexist, by repeating the sulfide reaction and precipitation/filtration while adjusting the acidity (pH) in the reaction to within a suitable range, it may be possible to separately recover each individual metal as a sulfide precipitate from wastewater in which ions of a plurality of different metals coexist.

If separate recovery of each individual metal as a sulfide is possible, then this is advantageous for recycling compared with the case of a sludge in a mixed state. The amount of impurities is lower than in the case of a mixed state, and hence the value when carrying out recovery as a recyclable resource at a smelting plant (resource recovery) is increased (there are fewer penalties that act as negative factors when deciding the transaction price).

(5) No Effects of Complexing Agent, with Easy Advanced Treatment

Various complexing agents commonly used in plating processes have an effect of dissolving heavy metal ions in the form of a complex. In the case of the publicly known hydroxide method, the heavy metal in such a complex cannot be captured in the form of a hydroxide, and hence the residual heavy metal concentration after the treatment does not become sufficiently low. In contrast, with the sulfide method, in many cases complexes have little effect, and hence the residual heavy metal concentration after the treatment is sufficiently low.

Consequently, in publicly known art, the sulfide method is carried out in supplementary fashion as finishing treatment for wastewater that cannot be treated sufficiently with the hydroxide method or as a method for avoiding the adverse effects of a complexing agent. However, in this case, again there is no control method for carrying out the reaction with suitable amounts, and hence the sulfidizing agent is mixed in to an excess as deemed appropriate, and to resolve problems such as generation of hydrogen sulfide gas, which is toxic and malodorous, redissolution of the precipitate, and colloid formation that occur as a result, a large amount of a compound of a polyvalent metal, i.e. a large amount of Al ions, Fe ions or the like, is added. As a result, a large amount of sludge containing the added polyvalent metal compound is generated, and moreover the content of the targeted heavy metal in the sludge drops, which may result in recycling not being possible.

In contrast, with the improved sulfide method of the present invention, there is no need to add any extra substance other than the coagulant for the precipitation, and hence the amount of sludge can be made to be low, and moreover sludge having a high content of the targeted heavy metal can be obtained, which is advantageous for use in recycling.

(6) Control of Addition of Sulfidizing Agent through Gas Monitoring

In the present invention, the most important constituent feature is that hydrogen sulfide gas generated during the reaction is monitored using a hydrogen sulfide gas monitor, whereby the supply of the sulfidizing agent is controlled appropriately.

As described in (1), to make the reaction between the heavy metal ions and the sulfide ions proceed sufficiently to serve the objective of the treatment, and prevent the amount of the sulfidizing agent from becoming excessive, the concentration of sulfide ions in the reaction liquid must be kept at an "appropriate" value which is a slight excess.

There is a certain relationship that can be determined experimentally between the concentration of sulfide ions in the reaction liquid and the hydrogen sulfide gas concentration in the air above the reaction liquid, and hence if the hydrogen sulfide gas concentration in the air can be controlled (the controlled hydrogen sulfide gas concentration), then the concentration of sulfide ions in the liquid can be controlled.

The monitoring of the generated hydrogen sulfide gas is carried out by sucking out the hydrogen sulfide gas in the air above the reaction liquid in a reduced pressure state, and introducing this hydrogen sulfide gas into the detection tube of the monitor. Because the suction is carried out in a reduced pressure state, external air gets mixed in, and thus the hydrogen sulfide gas is diluted by this air. The dilution factor due to the external air (i.e. the mixing ratio) is adjusted using a flow meter such that the hydrogen sulfide gas concentration resulting from the dilution falls within a suitable sensitivity range for the hydrogen sulfide gas monitor.

(7) Capture and Reuse of Hydrogen Sulfide Gas

Some of the sucked out hydrogen sulfide gas is bypassed for monitoring, but the remainder is surplus gas. In the apparatus of the present invention, this surplus gas and the gas that has been subjected to the monitoring are combined, and are not discharged directly to the outside, but rather are passed through a scrubber of a suitable size and captured by an alkaline liquid (a caustic soda aqueous solution), and then this liquid (sodium sulfide solution) is returned to the sulfidizing agent tank and reused.

Carrying out the gas monitoring in a reduced pressure state is one contrivance for making it such that the hydrogen sulfide gas can be almost completely collected and reused, without leaking to the outside.

EXAMPLES

Example 1

Figure 5:
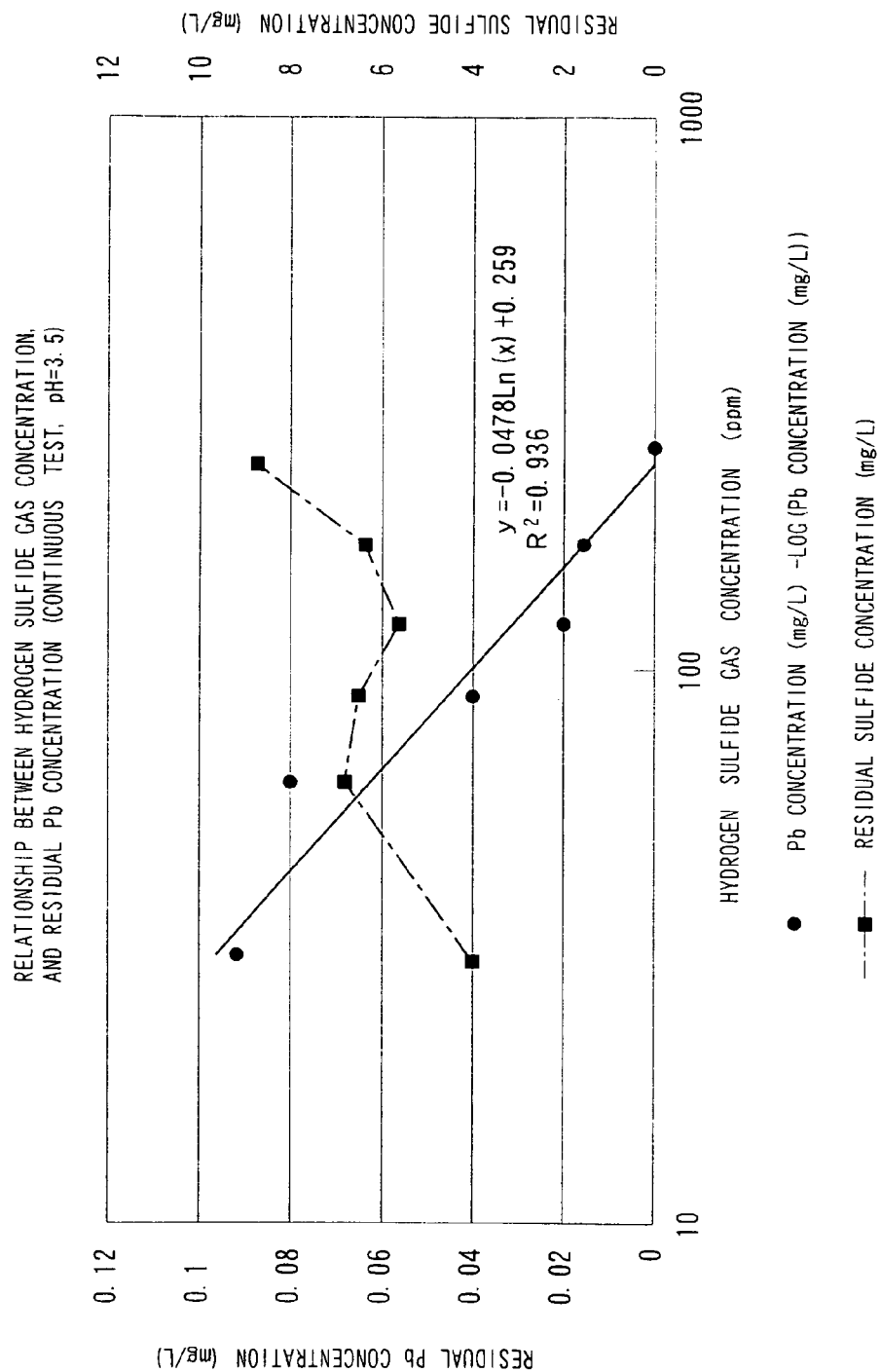
FIG. 5 is a graph of data obtained upon treating wastewater containing Pb ions in accordance with the present invention.

Using the continuous treatment apparatus shown in FIG. 4, the pH of standard lead wastewater (2 liters) containing 200 mg/L of lead ions was adjusted to 3.5 in the reaction tank 13. A set amount of sodium sulfide ($Na_2S$) as a sulfidizing agent was then added continuously at a rate of 1.1 mg/min to the pH-adjusted wastewater, thus carrying out sulfide treatment. The hydrogen sulfide gas was monitored after being diluted by a dilution factor of 12 times. The results are shown in FIG. 5. In FIG. 5, the horizontal axis shows the hydrogen sulfide gas concentration on a logarithmic scale, and the vertical axis shows the residual Pb concentration and the residual sulfide concentration.

In FIG. 5, it can be seen that although the treated liquid contained 200 mg/L of Pb ions initially as mentioned above, when hydrogen sulfide gas was detected at a concentration of 30 ppm, the residual Pb ion concentration in the treated liquid had dropped greatly down to 0.09 mg/L.

Moreover, at this time, the residual sulfide concentration was 4.00 mg/L (i.e. total amount 8 mg), which in terms of the total amount was 1/8 of the stoichiometric amount for reacting with 400 mg of Pb in accordance with previously mentioned reaction formula 2. The amount of sulfide remaining in the liquid after the treatment was thus very low.

In the case of further continuing to add the sodium sulfide ($Na_2S$) such that the detected hydrogen sulfide gas concentration increased as shown in FIG. 5, the residual Pb ion concentration dropped accordingly, with the residual Pb ion concentration reaching 0 ppm when the hydrogen sulfide gas concentration reached 240 ppm.

Example 2

Using the continuous treatment apparatus shown in FIG. 4 as in Example 1, the pH of standard copper wastewater (2 liters) containing 200 mg/L of copper ions was adjusted to 1.6. A set amount of sodium sulfide ($Na_2S$) was then added continuously at a rate of 1.1 mg/min to the pH-adjusted wastewater, thus carrying out sulfide treatment. The hydrogen sulfide gas was monitored after being diluted by a dilution factor of 12 times. The results are shown in FIG. 6.

Figure 6:
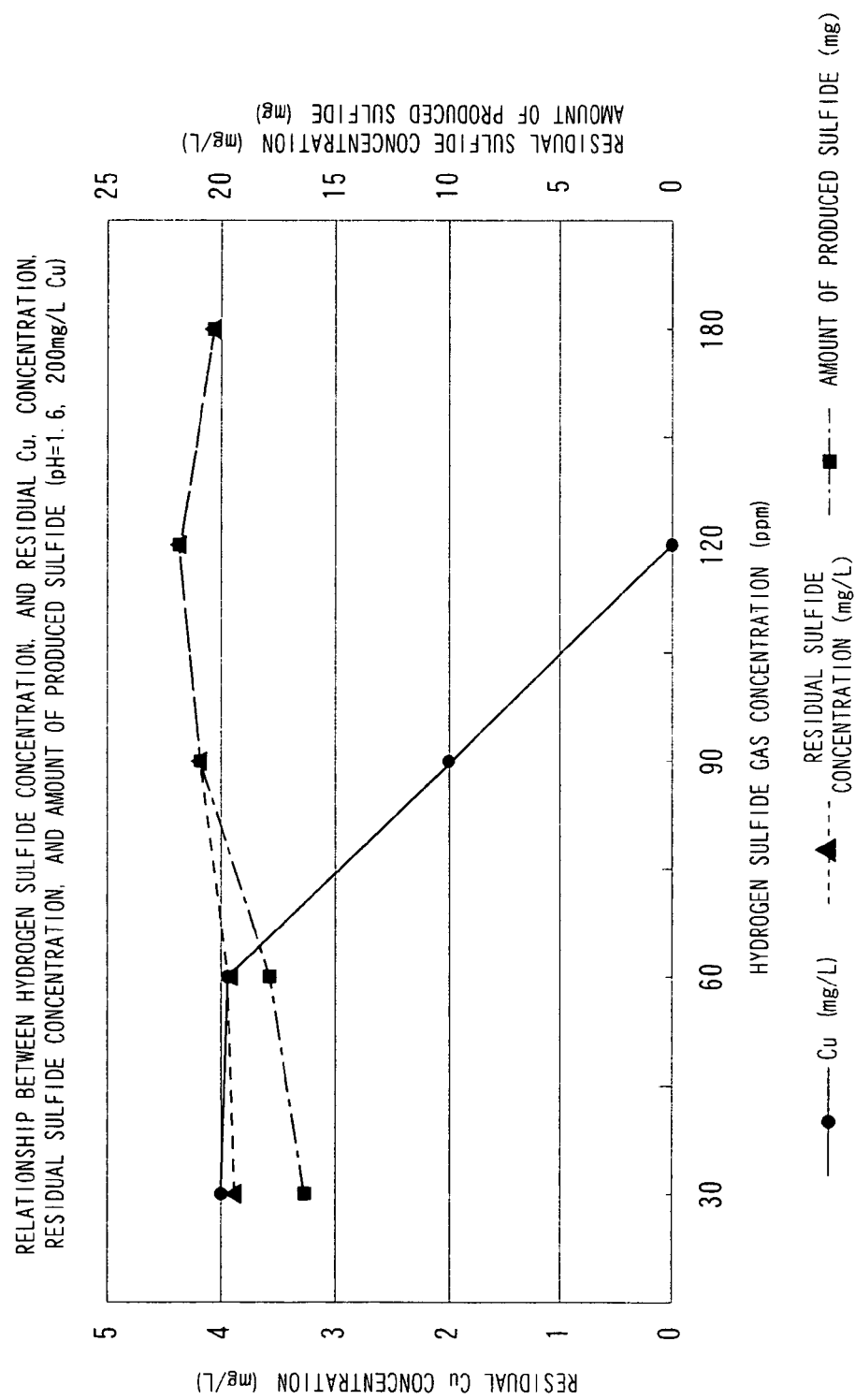
FIG. 6 is a graph of data obtained upon treating wastewater containing Cu ions in accordance with the present invention.

In FIG. 6, it can be seen that although the treated liquid contained 200 mg/L of Cu ions initially as mentioned above, when hydrogen sulfide gas was detected at a concentration of 30 ppm, the residual Cu ion concentration in the treated liquid had dropped greatly down to 4.0 mg/L. Moreover, at this time, the residual sulfide concentration was 19.5 mg/L, which was 1/5.2 of the stoichiometric amount. The amount of sulfide remaining in the liquid after the treatment was thus very low.

In the case of further continuing to add the sodium sulfide ($Na_2S$) such that the detected hydrogen sulfide gas concentration increased as shown in FIG. 6, the residual Cu ion concentration dropped accordingly, with the residual Cu ion concentration reaching 0 ppm when the hydrogen sulfide gas concentration reached 120 ppm.

Example 3

Using the continuous treatment apparatus shown in FIG. 4 as in Example 1, the pH of nickel-containing wastewater (2 liters) containing 200 mg/L of Ni ions was adjusted to 8.5. A set amount of sodium sulfide ($Na_2S$) was then added continuously at a rate of 1.1 mg/min to the pH-adjusted wastewater, thus carrying out sulfide treatment. The hydrogen sulfide gas was monitored after being diluted by a dilution factor of 12 times. The results are shown in FIG. 7.

Figure 7:
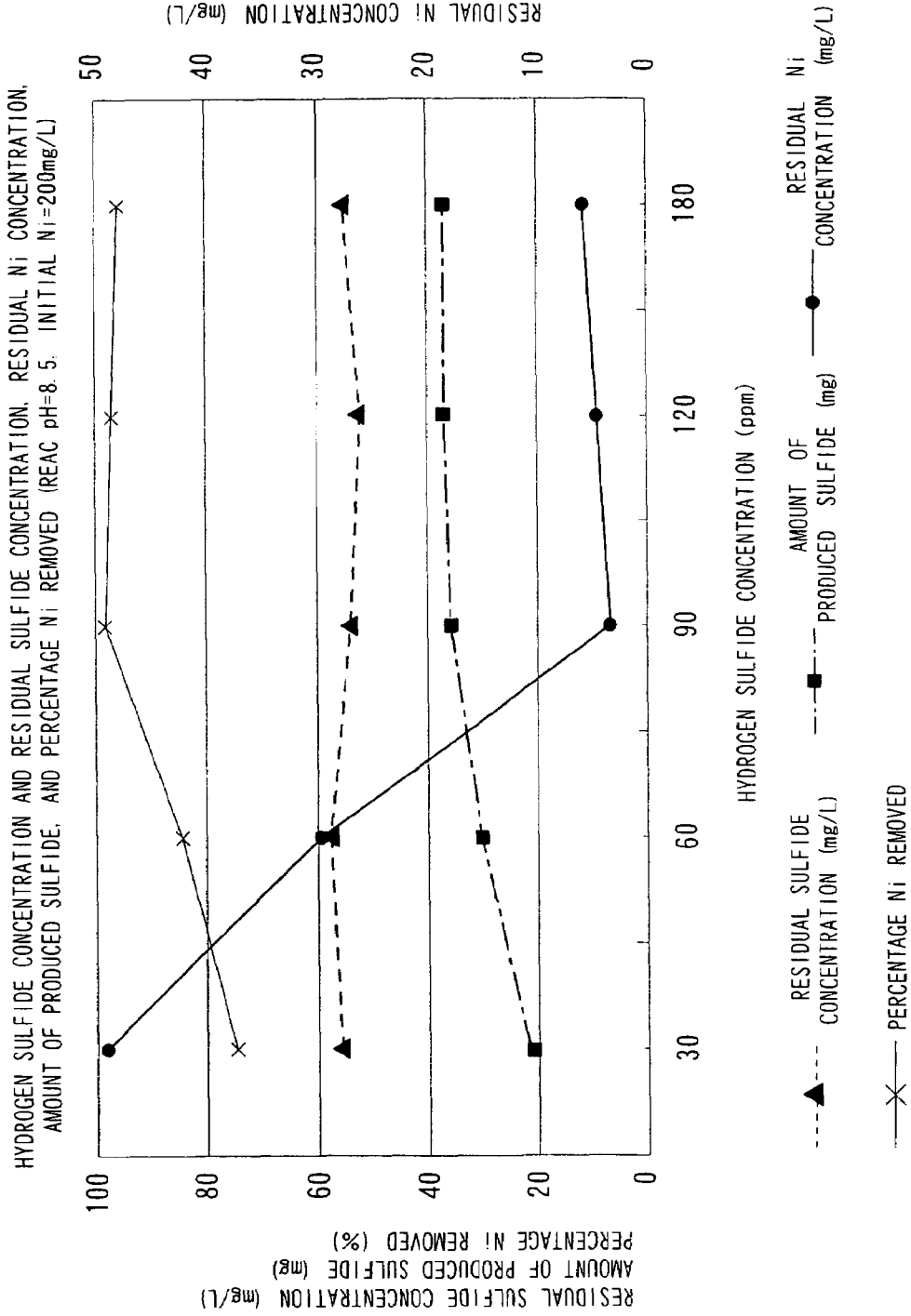
FIG. 7 is a graph of data obtained upon treating wastewater containing Ni ions in accordance with the present invention.

As shown in FIG. 7, the residual Ni concentration had dropped down to 3 mg/liter when the hydrogen sulfide gas concentration was 90 ppm. Note that the residual Ni concentration increased when the hydrogen sulfide gas concentration increased from 90 ppm to 120 ppm and then 180 ppm, and it is thought that this is because nickel persulfide was produced and redissolution occurred.

Example 4

A description will be given of an example relating to separating zinc (Zn) and nickel (Ni) from a mixed liquid containing the two. An example of such a mixed liquid is an electroless nickel plating liquid containing zinc.

Figure 8:
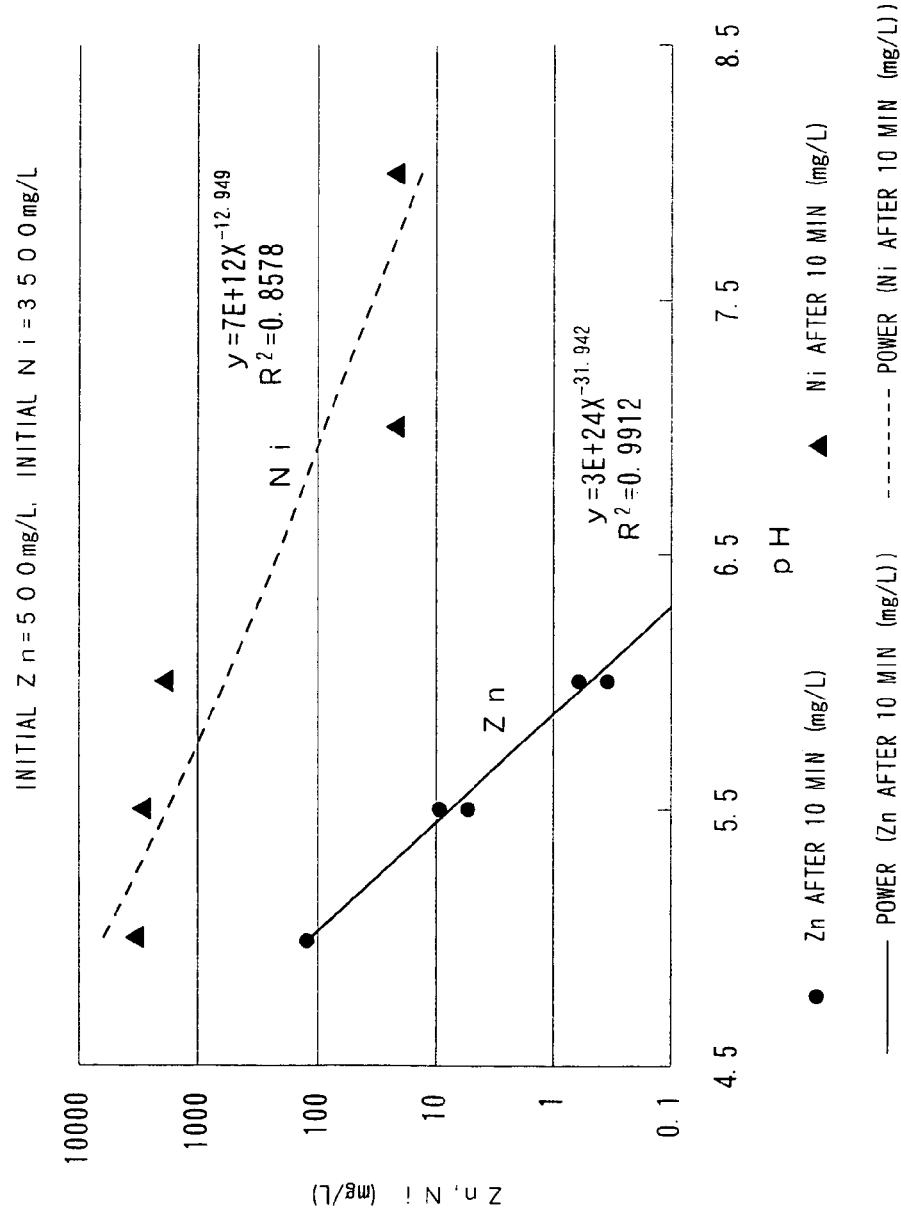
FIG. 8 is a graph of data obtained upon carrying out treatment to separate Zn and Ni out from a mixed liquid containing Zn and Ni in accordance with the present invention.

FIG. 8 shows the results of treating wastewater having an initial Zn concentration of 500 mg/L and an initial Ni concentration of 3500 mg/L in accordance with the present invention. According to the experimental results shown in FIG. 8, if a sulfide is produced with the pH adjusted to 5.5, then after 10 minutes the Zn has been removed down to a residual concentration of 6.2 mg/L, with a corresponding amount of ZnS being produced. Note that if excess sulfide continues to be added even after the Zn concentration has dropped in this way, then Ni is removed accordingly; it is thought that the optimum reaction time is approximately 30 minutes. Compared with the residual Zn concentration, at the above-mentioned point in time after 10 minutes has passed, the residual Ni concentration has only dropped down to approximately 2000 mg/L. In other words, in the case of adjusting the pH to 5.5, not much NiS is produced upon adding the sulfidizing agent.

In the case of the wastewater used in the experiment of FIG. 8, regarding the sulfide produced upon reacting at pH 5.5 as a first reaction, for example at a reaction time of 30 minutes, the amount of ZnS produced is 955 mg/L, and the amount of NiS produced at this time is 564 mg/liter, and hence in this case the NiS impurity rate relative to the ZnS is 564/(955+564)=37.1%. Upon subsequently reacting at pH 7.0 as a second reaction, the amount of ZnS produced is 8.9 mg/L, and the amount of NiS produced at this time is 2905 mg/L.

As a result, the ZnS impurity rate relative to the NiS for the sulfide obtained through the second reaction is only 0.31%, i.e. related to the ZnS contamination rate, NiS of high purity exceeding 99% can be obtained. ZnS of high purity cannot be obtained in the first reaction, with the impurity rate being 37.1%, but in general Ni is more valuable than Zn, and hence it is economically effective to sacrifice the purity of the ZnS somewhat so that high-purity NiS can be obtained.

In contrast with this, a description will be given of the case of reacting at pH 6.0 as the first reaction, and then reacting at pH 7.0 as the second reaction. In this case, upon removing most of the Zn by reacting, for example, for 30 minutes at pH 6.0 as the first reaction, 969 mg/L of ZnS is produced, but at this time 3316 mg/L of NiS is also produced. In this case, the NiS impurity rate relative to the ZnS is greatly increased to 77.1%.

In the case of next further operating for 30 minutes at pH 7.0 as the second reaction, the amount of ZnS produced drops down to 0.1 mg/L, and the amount of NiS produced becomes 1325 mg/L. The ZnS impurity rate relative to the NiS in this second reaction thus drops down to 0.0081%.

However, although the purity of the NiS obtained in the second reaction is extremely high in this way, the amount of NiS produced is only 1325 mg/L, which is less than half of the 3316 mg/L for the first reaction. In other words, out of the nickel contained in the raw water, that made into a sulfide at high purity is only approximately one third of the total. Moreover, as described above, the ZnS produced in the first reaction has a high impurity rate.

Consequently, reacting at pH 6.0 as the first reaction and then reacting at pH 7.0 as the second reaction in this way is by no means highly efficient.

In contrast, if reaction is carried out at pH 5.5 as the first reaction and then reaction is carried out at pH 7.0 as the second reaction as described earlier, then in the first reaction at pH 5.5, not much of the Ni becomes NiS, but most of the Zn becomes ZnS and is removed. Then, in the subsequent second reaction at pH 7.0, because there is hardly any Zn present, Ni becomes the sulfide NiS almost exclusively. It can thus be considered that selecting this reaction process is best.

Example 5

A description will now be given of other examples for removing Pb from wastewater containing Pb by producing PbS.

Figure 9:
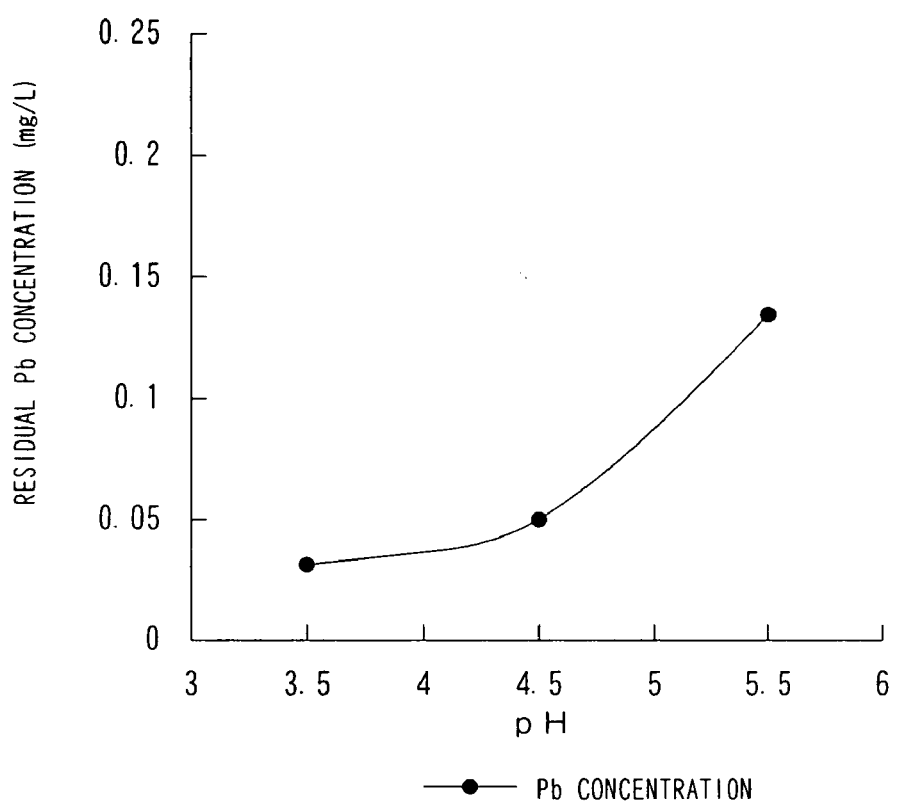
FIG. 9 is a graph of data obtained upon carrying out batch treatment on wastewater containing Pb ions in accordance with the present invention.

FIG. 9 is a graph of experimental data showing the relationship between the pH of the treated wastewater and the residual Pb concentration for the case of carrying out reaction by adding a sulfidizing agent in batch treatment. As is clear from FIG. 9, the result that the residual Pb concentration rises as the pH rises was obtained. It was thought that this is because Pb is an amphoteric metal, and hence a little lead hydroxide is produced even during the reaction with a sulfide, and the solubility of this lead hydroxide increases as the pH increases.

As shown in FIG. 9, in the case that the controlled hydrogen sulfide gas concentration was 120 ppm, when batch treatment was carried out with an initial Pb concentration of 64 mg/L, then when the pH of the treated wastewater was 3.5 to 4.5, the residual Pb concentration was 0.05 mg/L or less.

Figure 10:
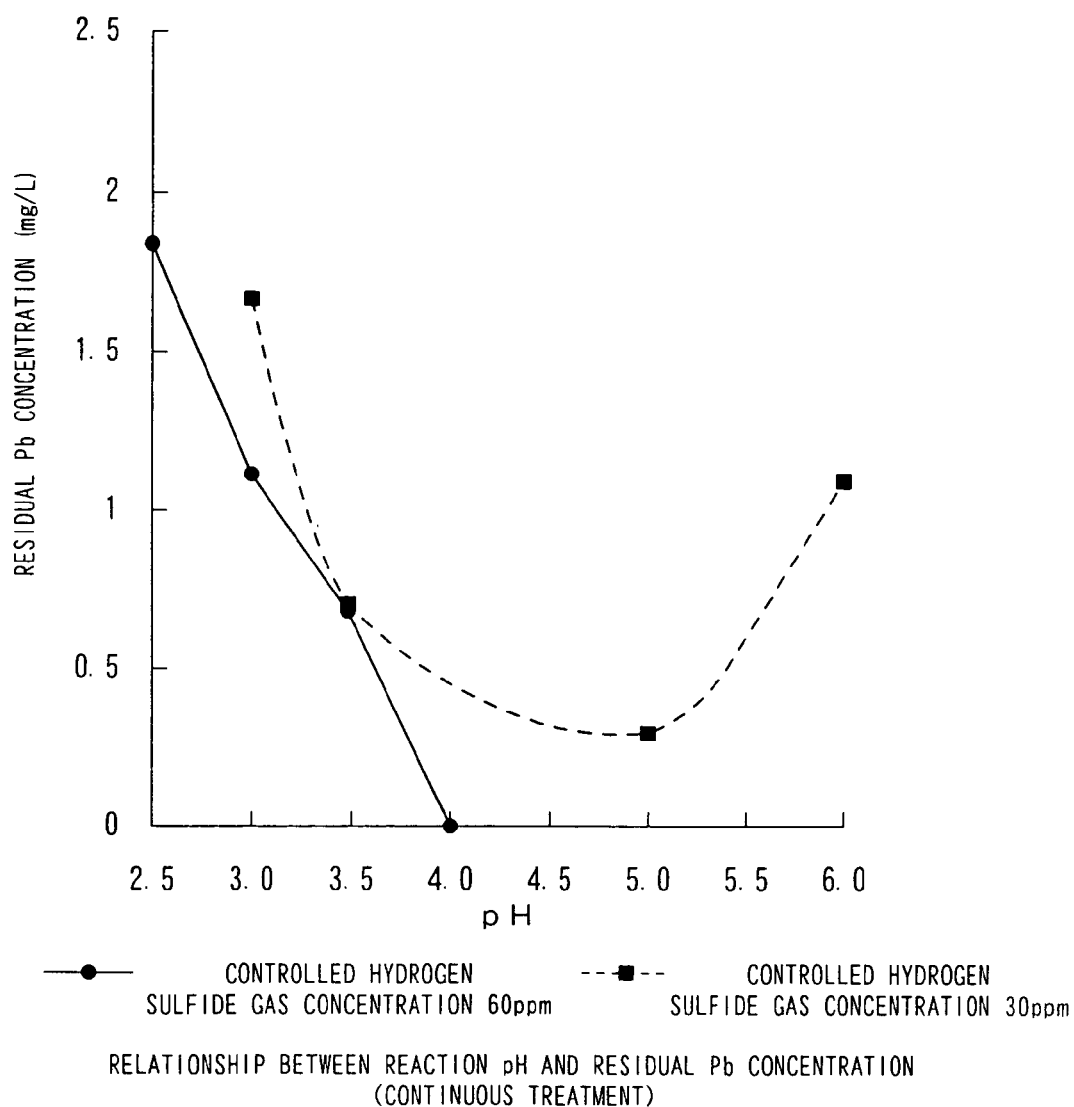
FIG. 10 is a graph of data obtained upon carrying out continuous treatment on wastewater containing Pb ions in accordance with the present invention.

FIG. 10 is a graph of experimental data showing the relationship between the pH of the treated wastewater and the residual Pb concentration in continuous treatment. As is clear from FIG. 10, in the case that the controlled hydrogen sulfide gas concentration was 60 ppm, a linear relationship was seen between the pH of the treated wastewater in the reaction and the residual Pb concentration, with the residual Pb concentration being 0.01 mg/L when the pH was 4.0.

On the other hand, in the case that the controlled hydrogen sulfide gas concentration was 30 ppm, up to pH 5.0 the residual Pb concentration dropped gradually as in the 60 ppm case, but beyond pH 5.0 the residual Pb concentration conversely started to rise, with the residual Pb concentration exceeding 1 mg/L at pH 6.0.

This was also seen in the case of the batch type treatment described above; it is thought the residual Pb concentration rose as shown in FIG. 10 because, in the case that the controlled hydrogen sulfide gas concentration is low, lead hydroxide is prone to being produced, and moreover Pb has properties like those of an amphoteric metal, and due to this the solubility of the Pb increases with an increase in the pH.

From the above results of experiments into batch treatment and continuous treatment, it can be considered that the controlled hydrogen sulfide gas concentration must be at least 60 ppm, and that the optimum pH of the treated wastewater is around 4.0. Note that FIG. 2 shows results of carrying out treatment at a pH of 4.0 in this way.

Example 6

A description will now be given of examples of analyzing the water content and the heavy metal content of sulfide sludges produced using the method of the present invention.

With NiS sludge, the water content was 52 to 57 mass %, the Ni content on a dry basis was 40 to 45 mass %, and the Ni content on a wet basis was 19 to 20 mass %.

With Pb sludge, the water content was 50 to 60 mass %, the Pb content on a dry basis was 53 mass %, and the Pb content on a wet basis was 23 to 24 mass %.

With the publicly known hydroxide method, the water content of the metal hydroxide sludge is generally approximately 80 mass %, at best approximately 75 mass %. Moreover, the heavy metal content on a wet basis, while varying according to the metal, is generally less than 10%.

In contrast with this, according to the method of the present invention, for example in the case of Pb, as described above, the water content can be reduced down to 50 to 60%, and moreover the Pb content on a wet basis can be increased to 23 to 24%.

The Pb content on a dry basis was 53 mass %, whereas if the whole of the sulfide sludge were PbS then the Pb content would be 86% as the theoretical value. The difference from this theoretical value is thought to be due to contamination with other organic salts (e.g. sodium sulfide). However, in general if this content is at least 50% then the sludge is valuable, and hence the Pb sulfide sludge obtained using the method of the present invention can be recycled usefully.

The invention claimed is:

1. A method of treating heavy-metal-containing wastewater using a sulfidizing agent, the method comprising the steps of:
    adding the sulfidizing agent to the heavy-metal-containing wastewater to produce a heavy metal sulfide precipitate at a pH not exceeding 8, while detecting a concentration of hydrogen sulfide gas generated from the wastewater;
    regulating the amount of sulfidizing agent that is added to the wastewater based upon the detected concentration of hydrogen sulfide gas such that a trace amount of hydrogen sulfide gas is generated, the trace amount of hydrogen sulfide gas corresponding to a detected concentration of hydrogen sulfide gas that exceeds 0 ppm but is not more than a hydrogen sulfide gas concentration corresponding to a liquid reaction endpoint for the heavy metal, the generation of the trace amount of hydrogen sulfide gas indicating a state in which there is a very slight excess of the sulfidizing agent in the wastewater and signifying an endpoint of a reaction between heavy metal ions and sulfide ions in the wastewater; and
    the regulation of the amount of sulfidizing agent that is added to the wastewater further including ceasing to add the sulfidizing agent when the endpoint of the reaction between the heavy metal ions and sulfide ions is reached;
    whereby the heavy metal ions are sufficiently removed from the wastewater, generation of excessive hydrogen sulfide gas is suppressed, and redissolution of heavy metal sulfide precipitate caused by polysulfide production, which hampers solid-liquid separation, is prevented.

2. The method of treating heavy-metal-containing wastewater using a sulfidizing agent according to claim 1, wherein the sulfidizing treatment is carried out by adding the sulfidizing agent to the heavy-metal-containing wastewater such that the detected concentration of hydrogen sulfide gas exceeds 0 ppm but is not more than 240 ppm.

3. The method of treating heavy-metal-containing wastewater using a sulfidizing agent according to claim 1, wherein hydrogen sulfide gas generated from the wastewater is diluted with air, and then the hydrogen sulfide gas concentration is detected using a hydrogen sulfide gas monitor.

4. The method of treating heavy-metal-containing wastewater using a sulfidizing agent according to claim 1, wherein a coagulant is used on the heavy metal sulfide produced through the sulfidizing treatment.

5. The method of treating heavy-metal-containing wastewater using a sulfidizing agent according to claim 1, wherein after the sulfidizing treatment, the wastewater is subjected to stripping under acidic conditions, thus converting unreacted sulfidizing agent into hydrogen sulfide gas.

6. The method of treating heavy-metal-containing wastewater using a sulfidizing agent according to claim 5, wherein the generated hydrogen sulfide gas is captured and collected.

7. The method of treating heavy-metal-containing wastewater using a sulfidizing agent according to claim 1, wherein the generated hydrogen sulfide gas is captured and collected.

8. A method of separately recovering each of a plurality of metals from wastewater in which are mixed ions of the plurality of metals, comprising repeating for each of the metals a process of adjusting the acidity of the wastewater to within a range suitable for the metal to be separated out and recovered, carrying out a sulfidizing reaction on that metal to produce a metal sulfide using the method according to any one of claims 1 through 7 and 6, and precipitating and filtering off the metal sulfide produced.

* * * * *